United States Patent [19]

Siddall

[11] Patent Number: 4,487,629

[45] Date of Patent: Dec. 11, 1984

[54] ZIRCONIUM ISOTOPE SEPARATION

[75] Inventor: Mark B. Siddall, Albany, Oreg.

[73] Assignee: Teledyne Industries, Inc., Los Angeles, Calif.

[21] Appl. No.: 77,144

[22] Filed: Sep. 19, 1979

[51] Int. Cl.$^3$ ....................... B01D 59/10; B01D 59/00
[52] U.S. Cl. ........................................ 75/84.4; 55/17; 204/157.1 R
[58] Field of Search ............. 204/157.1 R; 250/423 P; 55/17; 75/84.5

[56] References Cited

U.S. PATENT DOCUMENTS 4,082,633  4/1978  Eerkens ......................... 204/157.1 R

OTHER PUBLICATIONS

Dewitt, L. J. et al., "Isotopically Tailored Materials For Fission and Fusion Reactors", Report #MLM-2426(OP), 1977.

*Primary Examiner*—Deborah L. Kyle
*Attorney, Agent, or Firm*—Shoemaker and Mattare, Ltd.

[57] ABSTRACT

A method of separating zirconium isotopes by converting the zirconium to its iodide salt prior to separation by usual isotope methods. After separation the desired isotopes are converted from the salt to the metal by the van Arkel-de Boer iodide process.

7 Claims, No Drawings

ZIRCONIUM ISOTOPE SEPARATION

BACKGROUND OF THE INVENTION

1. Field of the Invention:

This invention relates to a method of producing isotopically tailored zirconium. More specifically it deals with a method for the separation of one or more isotopes of zirconium out of the natural metal.

2. Description of the Prior Art:

Zirconium is used as a cladding material for nuclear fuel in nuclear reactors. This metal lends itself to this use because it has a low thermal neutron absorption as compared with other metals.

Zirconium as used in nuclear reactors contains 11% of isotope zirconium-91 which has over 8 times the thermal neutron absorption cross-section of the naturally occurring zirconium isotope mixture. Removal of this isotope would improve the usefulness of zirconium as a nuclear reactor fuel cladding material.

The above fact is noted by R. Dewitt, W. R. Wilkes and L. J. Wittenberg of Monsanto Research Corp., Mound Laboratory, Miamisburg, Ohio and stated in a published article entitled "Isotopically Tailored Materials For Fission And Fusion Reactors", MLM-2426 (OP), Conf-770566-1. In this article it further states:

"Zircaloy (98% zirconium, 2% tin) is presently used as the fuel cladding in the heavy-water-moderated power reactors, known as CANDU reactors, which are manufactured in Canada. Neutron absorption by this cladding material is the dominant neutron loss mechanism. Of the neutron absorption in the Zircaloy, nearly 60% occurs in the isotope zirconium-91, and 10% occurs in the impurity isotope hafnium-177. Critoph has suggested that optimizing the zirconium isotopes 90 and 94 in the Zircaloy cladding could improve the neutron economy, resulting in a reduction in the fuel loading of approximately 6% and increasing the conversion ratio in a uranium/thorium breeder by 5-6%. He has calculated the allowable cost for isotopically tailored Zircaloy containing less than 5% zirconium-91 could be as high as 1,000/kg in a non-breeder reactor (nearly 25 times the present cost) and up to $3,000/kg in a U/Th breeder."

The separation of zirconium isotopes would be roughly as expensive as the separation of $U^{235}$ from $U^{238}$, therefore, any process for production of isotopically tailored zirconium would have to provide very high yields to product after isotope separation. Present methods of chlorination and Kroll reduction of chlorides do not produce high enough yields to be practical.

The separation of isotopes by gaseous diffusion or centrifugation or calutron or laser separation requires a gaseous compound. $ZrCl_4$ would not be satisfactory because chlorine has 2 stable isotopes which would interfere with separation. $ZrF_4$ has been used for chemical reduction but is not a favorable material in that the reaction energy would be high making it difficult to reduce to metal. Fluoride salts also do not distill readily and are very toxic.

Although isotopically tailored zirconium is desired for the more efficient operation of nuclear reactors it is not at present commercially feasible because of the high cost of isotopic separation followed by low yield reductions by prior methods. An economic separation method is therefore needed in this field.

BRIEF SUMMARY OF THE INVENTION

It is therefore one object of the present invention to set forth a new process for economically separating one or more zirconium isotopes from natural zirconium.

An additional object of the present invention is to produce an isotopically tailored zirconium by forming $ZrI_4$, separating out zirconium-91 tetraiodide and subsequently reducing the remaining $ZrI_4$ to zirconium metal.

A still further object of the present invention is to provide a method for processing zirconium metals free of zirconium-91 for the production of nuclear fuel cladding material from this metal or subsequently produced alloys.

These and other advantages will become apparent from the following detailed description.

In accordance with the above object it has been found that isotopically tailored zirconium having zirconium-91 removed therefrom can be produced economically by reacting the zirconium with iodine to produce the iodide. The zirconium-91 iodide can be separated from the other isotopes of zirconium iodide more easily than other zirconium salts and subsequently the tailored zirconium iodide can be reduced with high yield to product, in an iodide crystal bar cell, producing high purity zirconium crystal bar by the van Arkel - de Boer iodide process.

DETAILED DESCRIPTION OF THE INVENTION

This invention sets forth a process for separating one or more zirconium isotopes from the other isotopes of zirconium. It has been found that zirconium-91 has the largest amount of thermal neutron absorption of all of the zirconium isotopes. If this isotope where removed the zirconium remaining would be considerably more efficient as a nuclear fuel cladding material for use in nuclear reactors. This would increase the amount of energy that can be extracted from a given quantity of nuclear fuel in a nuclear reactor, while simultaneously increasing the time between reactor shutdowns for refueling. Further, this would also decrease the amount of spent nuclear fuel generated so as to reduce the rate of spent fuel storage and/or reprocessing.

The present invention uses $ZrI_4$ as the separation medium since iodine has only one stable isotope. Following the separation, $ZrI_4$ can be converted directly to high purity zirconium crystal bar by the van Arkel - de Boer iodide process which produces nearly 100% yield efficiency.

For a better idea of the zirconium isotopes and their absorption, refer to the following Table I which shows the breakdown of zirconium isotopes and their neutron absorptions.

TABLE I

| Zr Isotopes | % of Isotope | Thermal Neutron Absorption Cross-section Of Isotope $10^{-24}$ cm$^2$ (barns) | Separated % of Isotope | Absorption |
|---|---|---|---|---|
| $Zr^{90}$ | 51.46 | .1 (or less)* | 59.66 | .1 |
| $Zr^{91}$ | 11.23 | 1.52 | — | — |
| $Zr^{92}$ | 17.11 | .25 | 14.76 | .25 |
| $Zr^{94}$ | 17.40 | .08 | 5.01 | .08 |
| $Zr^{96}$ | 2.8 | .1 | 2.42 | .1 |
| Natural Zr | 100 | .18 | 86.25 | — |
| Weight Avg. | 100 | .28 | 100 | .11 |

TABLE I-continued

| Zr Isotopes | % of Isotope | Thermal Neutron Absorption Cross-section Of Isotope $10^{-24}$ cm$^2$ (barns) | Separated % of Isotope | Absorption |
|---|---|---|---|---|
| % Natural | — | 100% | — | 39.4 |

*Current measurements at Chalk River Laboratories in Canada indicate an even lower value of absorption for Zr$^{90}$.

In the present process zirconium metal containing all of its isotopes is reacted with elemental iodine at temperatures of about 300°–600° C. to produce ZrI$_4$. Means of producing this compound is by passing iodine vapor over a bed of zirconium sponge feed material at a temperature of about 300°–600° C. A typical example of how ZrI$_4$ can be produced is as follows:

EXAMPLE I

Manufacture of ZrI$_4$

Two kilograms of zirconium sponge is loose filled into a 1 liter Inconel R sealed purified container, heated to 450° C.

Eleven kilograms of iodine sublimed at 115° C. in another Inconel R container is slowly introduced into one end of the container containing the zirconium sponge.

Thirteen kilograms or less of ZrI$_4$ is withdrawn from the other end of the container and passed into a third Inconel R container at atmospheric pressure held at room temperature by a water bath. This causes the ZrI$_4$ to condense into a solid crystalline material.

Zirconium iodide can also be produced from zirconium oxide by the following equation:

$$ZrO_2 + 2I_2 + C \rightleftharpoons ZrI_4 + CO_2$$

Once the zirconium tetra-iodide is produced, the next step is to remove zirconium-91 iodide from one or more of the other isotopes. This part of the separation process can be effected by any of several well known processes for isotope separation. To more specifically illustrate this phase of the process, the following methods can be used:

1. Gas Centrifuge: This method uses the principle of countercurrent gas centrifuge for separating isotopes in an apparatus especially designed for this purpose. The apparatus process and formulas for this process are well known and illustrated in "Nuclear Chemical Engineering" by Manson Benedict and Thomas H. Pigford, 1957, McGraw-Hill Book Co., pp 510–515, incorporated herein by reference.

2. Gaseous Diffusion: This method makes use of the phenomenon of molecular effusion to effect separation. This process is illustrated and fully explained in "Nuclear Chemical Engineering" by Manson Benedict and Thomas H. Pigford, 1957, McGraw-Hill Book Co., pp 484–497, incorporated herein by reference.

3. Electromagnetic Method: In this method of calutron mass spectrometer is used for isotope separation. This method is described and illustrated in "Nuclear Chemical Engineering" by Manson Benedict and Thomas H. Pigford, 1957, McGraw-Hill Book Co., pp 372–376, incorporated herein by reference.

4. Photo Chemical Enrichment: By this method the isotopes of an element ordinarily indistinguishable, can be sorted out in the monochromatic light of a laser. This method is set forth and illustrated in "Scientific American", February 1977, pp 86–98, incorporated herein by reference.

When Photo Chemical Enrichment or Electromagnetic Separation is used it is possible for the process to be done concurrently with the van Arkel - de Boer type reduction process.

Although all of the above isotope separation processes are illustrated with regard to the separation of isotopes of Uranium, it is well known that these separation processes will work on isotopes of other metals. With regard to zirconium separation, however, it will be more difficult than Uranium isotope separation in that it will require a cut above and below the mass 91 isotope.

It is also possible however to separate more than one isotope. It is possible that one might want to make a cut between zirconium-91 and zirconium-90 and subsequently only use zirconium-90 for making the cladding material. It might also be desirable making a cut between zirconium-92 and zirconium-94, discarding zirconium-90, zirconium-91 and zirconium-92, thus retaining the isotopes with the lowest absorption. Another possible desirable cut would be between zirconium-91 and zirconium-92 discarding zirconium-90 and zirconium-91.

After the isotope zirconium-91 tetraiodide has been separated from the rest of the zirconium iodide, the resulting product, free of the 91 isotope, is passed on to the reduction process. In the reduction process the ZrI$_4$ is vaporized in a sealed container containing a hot wire filament. The container is known as the iodide crystal bar cell and the reduction process is known as the van Arkel - de Boer method. In this cell the zirconium deposits on the hot wire filament and the iodine gas is evacuated. An example of this process is as follows:

EXAMPLE II van Arkel - de Boer Type Reduction

Into the top of a sealed evacuated 5 liter Inconel R container which contains a heated zirconium wire filament, slowly introduce ZrI$_4$ sublimed from solid crystals in another sealed container. At the same time slowly evacuate the by-product iodine gas from a tube at the bottom of the hot wire container by condensing the iodine into a third container held at a controlled temperature which reduces the iodine vapor pressure below that which obtains in the hot wire container.

The result of this operation is zirconium metal deposited as a crystalline mass on the heated zirconium wire filament and elemental iodine plus unreacted zirconium iodides in the third condensing container.

As this invention may be embodied in several forms without departing from the spirit or essential characteristics thereof, the present embodiment is, therefore, illustrative and not restrictive, since the scope of the invention is defined by the appended claims rather than by the description preceding them; and all changes that fall within the mete and bounds of the claims or that form their functional as well as conjointly cooperative equivalent are, therefore, intended to be embraced by those claims.

I claim:

1. A method of producing isotopically tailored zirconium comprising
   reacting zirconium containing a mixture of desired and undesired zirconium isotopes with iodine to form zirconium tetraiodide containing a mixture of desired and undesired zirconium isotopes, separating the zirconium tetraiodide into a first fraction containing the undesired zirconium isotopes and a second fraction containing the desired zirconium isotopes, and subsequently reducing the second fraction in an iodide crystal bar cell to produce zirconium metal containing the desired zirconium isotopes.

2. The process of claim 1 wherein the first fraction contains at least one member selected from the group consisting of zirconium-90, zirconium-91, zirconium-92, zirconium-94 and zirconium-96 zirconium-91.

3. The process of claim 1 wherein the zirconium tetraiodide is formed by passing iodine vapor over a bed of zirconium sponge feed material at a temperature of about 300°–600° C.

4. The process of claim 1 wherein the first and second zirconium tetraiodide fractions are separated by gas centrifuge.

5. The process of claim 1 wherein the first and second zirconium tetraiodide fractions are separated by gaseous diffusion.

6. The process of claim 1 wherein the first and second zirconium in their iodide form tetraiodide fractions are separated by electromagnetic process.

7. The process of claim 1 wherein the first and second zirconium tetraiodide fractions are separated by photo chemical enrichment.

* * * * *